Patented Dec. 6, 1949

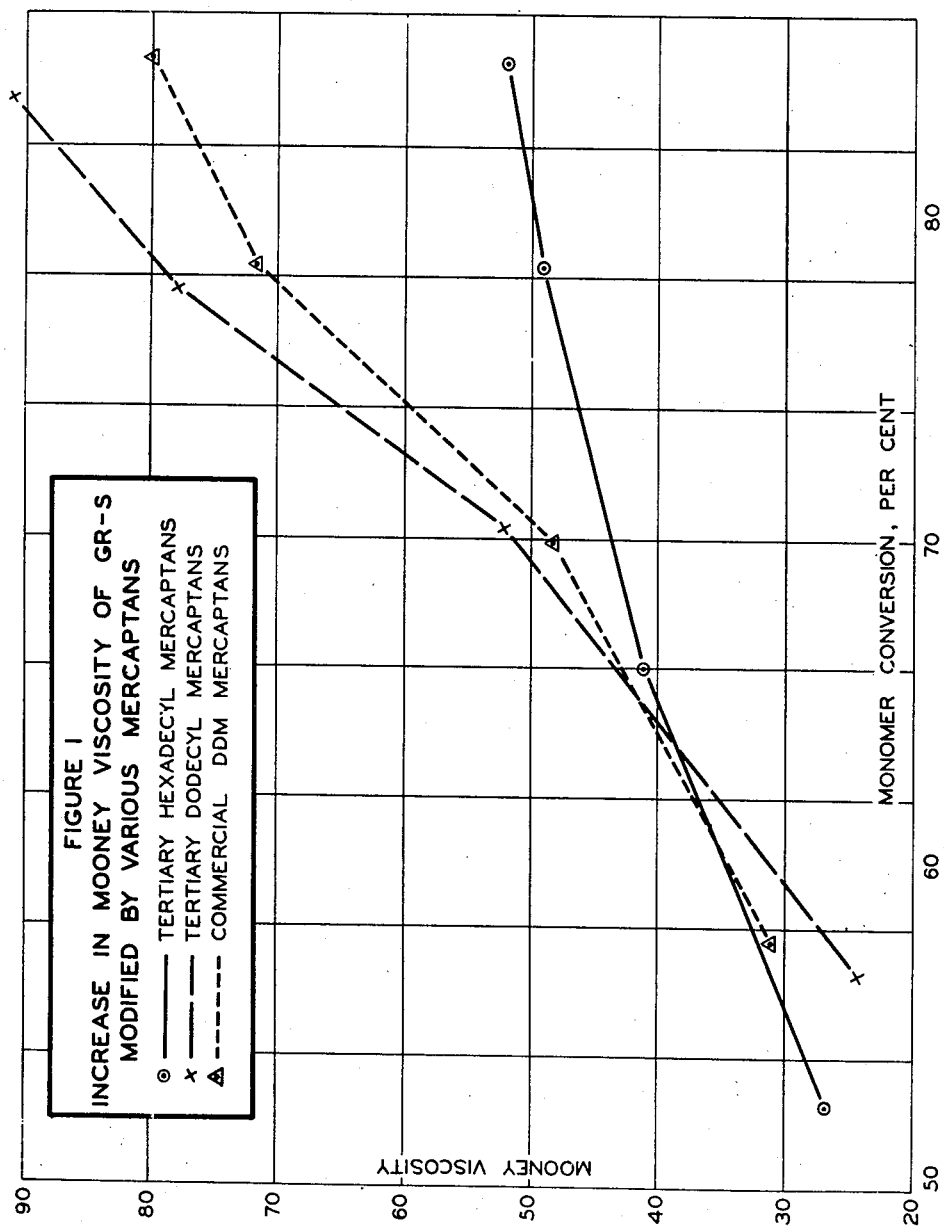

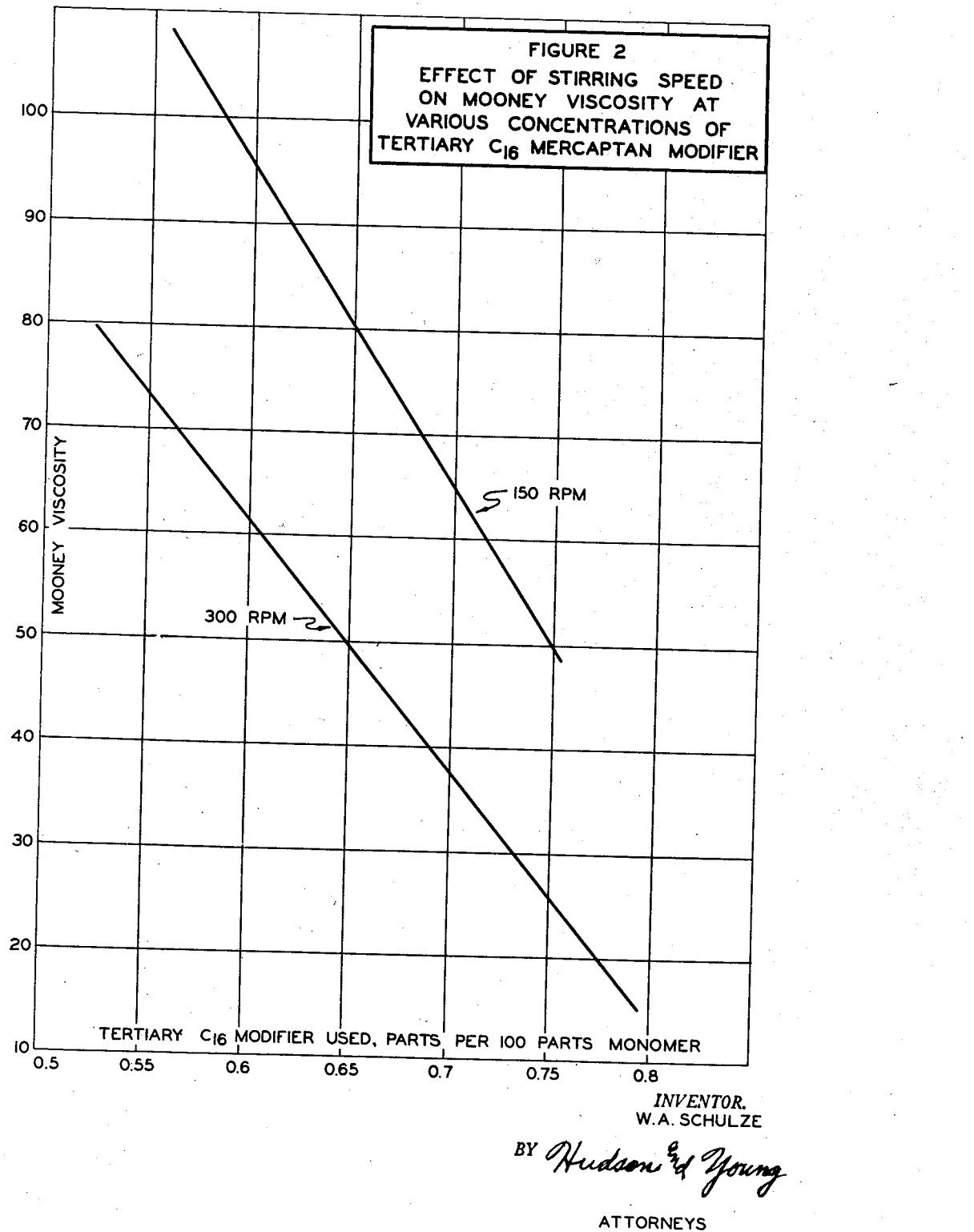

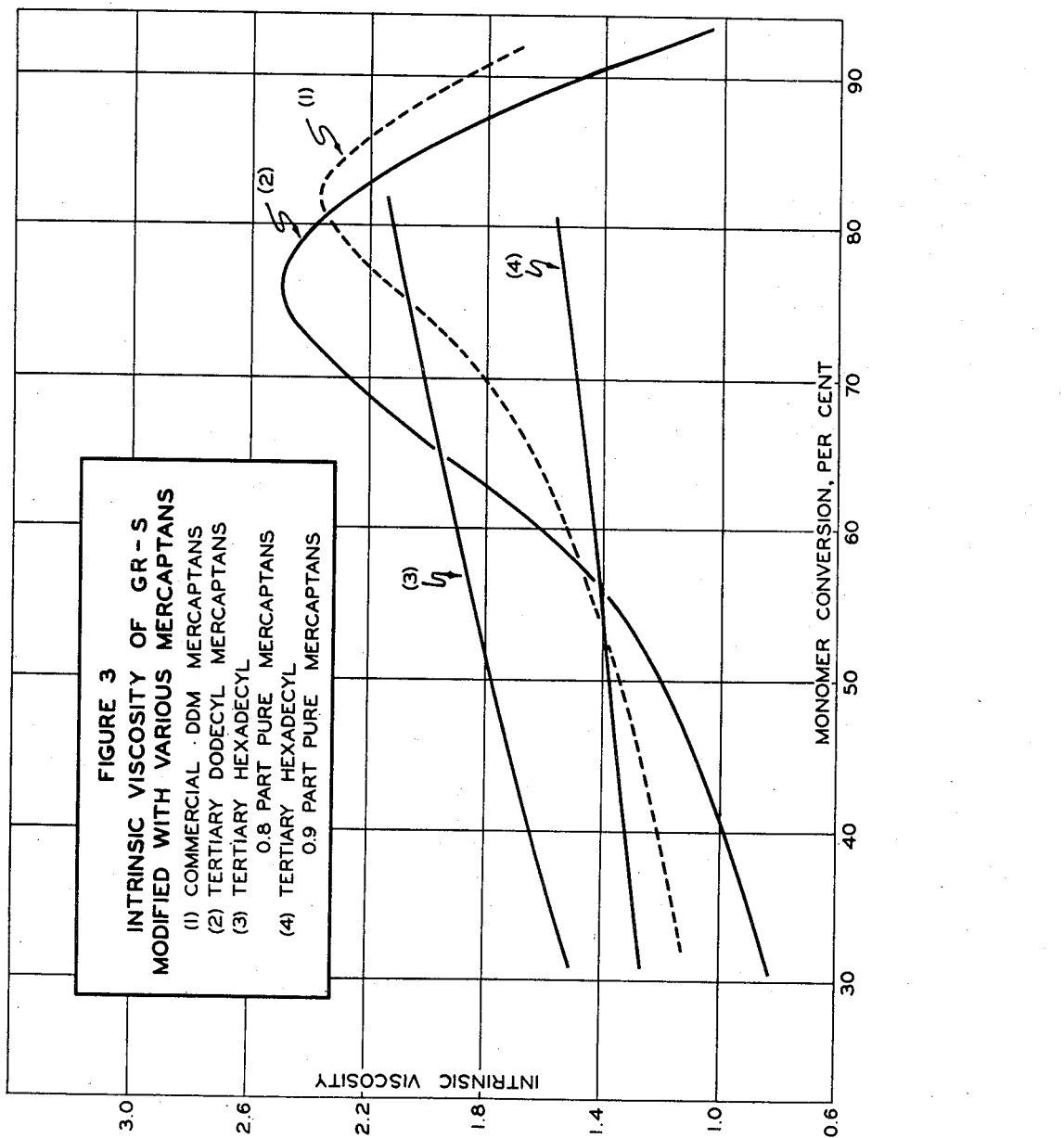

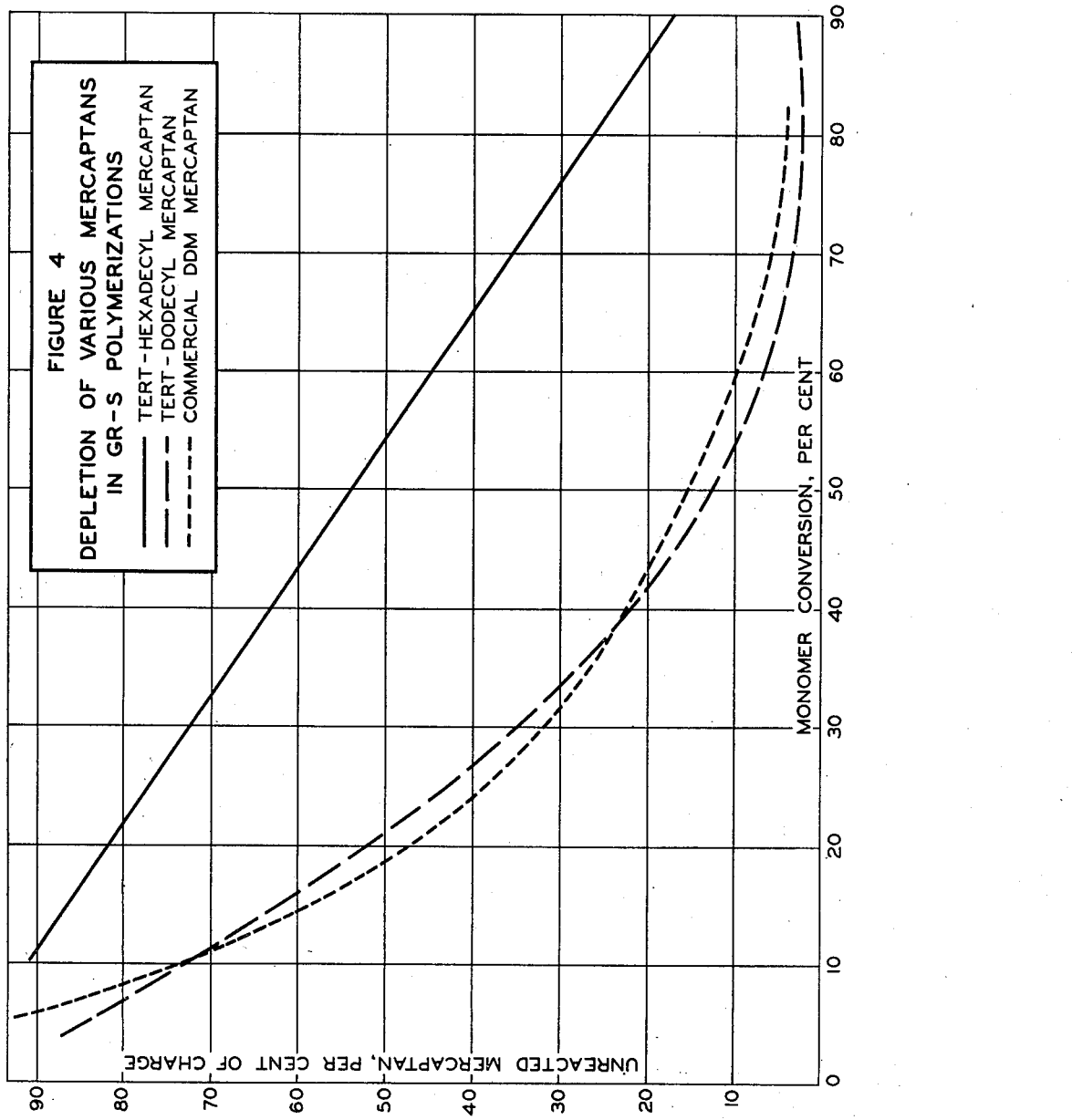

2,490,713

UNITED STATES PATENT OFFICE 2,490,713

CONTROLLING POLYMER PROPERTIES IN EMULSION POLYMERIZATION BY CONTROLLING INTENSITY OF AGITATION

Walter A. Schulze, Bartlesville, Okla., assignor to Phillips Petroleum Company, a corporation of Delaware Application August 13, 1945, Serial No. 610,605

4 Claims. (Cl. 260—84.3)

This invention relates to a process for the production of polymers of high molecular weight. It is particularly applicable to the production of synthetic rubber by the polymerization of polymerizable organic compounds in an aqueous emulsion. In one of its more specific aspects this invention relates to an improved process for emulsion polymerization of butadiene-styrene and other related comonomer systems using tertiary aliphatic mercaptans as modifying agents.

Synthetic rubber is made by polymerization of polymerizable organic compounds under controlled polymerization conditions. The term synthetic rubber is used broadly to include the polymerizates of olefins, diolefins, styrene and its derivatives, alkyl esters of acrylic and alkacrylic acids (e. g. methyl methacrylate), and other compounds having at least one active vinyl ($CH_2$=C<) group. These compounds are polymerized alone or in admixture with one another to form products having some of the characteristic properties of rubber. When a mixture of two or more of these compounds is subjected to polymerization conditions, a copolymer is formed in which the components combine to form molecules of high molecular weight by the linking together of the different individual component monomers. Of particular importance in the synthetic rubber field are copolymers of an aliphatic conjugated diolefin, particularly (butadiene-1,3), and a suitable comonomer. Butadiene may be polymerized in an aqueous emulsion with various known comonomers, for example, styrene, derivatives of styrene containing an active vinyl ($CH_2$=C<) group, acrylonitrile, methacrylonitrile, methyl acrylate, methyl methacrylate, etc., to form copolymers. GR-S, a butadiene-styrene copolymer, is an example of an important synthetic rubber so produced at the present time.

It is well known that copolymers of the GR-S type are unsuited for conversion into synthetic rubber unless the emulsion polymerization is carried out in the presence of certain additive substances designated as modifying agents. The general function of modifiers is to eliminate or to substantially reduce the formation, between polymer units, of cross linkages leading to the production of gel-type products which render the polymerizates deficient in desirable rubber-like properties. The most effective modifying agents heretofore known to the art have been selected alkyl mercaptans. The primary alkyl mercaptans having about 12 carbon atoms per molecule have been extensively used for this purpose. More recently, certain groups of tertiary alkyl mercaptans have been found to be advantageous.

The various alkyl mercaptans are not equivalent in their action as modifiers. In the copending patent application of W. W. Crouch and E. G. Marhofer, Ser. No. 575,819, filed Feb. 2, 1945, blends of certain mercaptans are shown to have improved properties in modifying the polymerization reaction as compared to the modifying action of individual mercaptans. In the copending patent application of W. A. Schulze and W. W. Crouch, Ser. No. 591,868, filed May 4, 1945, tertiary hexadecyl mercaptan is shown to be superior to primary mercaptans and other tertiary mercaptans, particularly those of lower molecular weight, as a modifier for the polymerization reaction.

The present invention provides an improved process for polymerization of the type employed in the manufacture of synthetic rubber of the GR-S type. By the present invention, synthetic rubbers having improved properties may be produced. These properties may be controlled within rather wide limits. This may be accomplished by controlling the rate of agitation during the polymerization reaction. I have found that by this means the proper amount of modifying agent may be maintained at the locus of the reaction in emulsion polymerization of butadiene-styrene type monomer mixtures at all times throughout the conversion period. Other means may be employed in conjunction with agitation to control the rate of diffusion of the alkyl mercaptan modifier to the locus of the reaction as will be more fully described hereinafter.

By the process of this invention, also, it is possible to produce butadiene-styrene copolymers wherein the sulfur content may be varied over a relatively wide range without any substantial change in properties such as ratio of butadiene to styrene, the intrinsic viscosity or the Mooney viscosity. Thus, at conversions of 75 to 85 per cent the sulfur content of the butadiene-styrene copolymer may readily be made as low as 0.07 per cent or as high as 0.16 per cent, and at other conversion levels somewhat wider limits are possible. This several fold difference in sulfur content of polymers of the same intrinsic viscosity and average mean molecular weight is obtainable using tertiary mercaptan modifiers as disclosed herein.

This invention may also be applied to polymerization systems other than butadiene-styrene, for example to isoprene-styrene, butadiene-chlorostyrene, butadiene-vinyl pyridine, butadiene-acrylonitrile, butadiene-methyl methacrylate and/or mixtures of the various conjugated compounds containing a terminal $CH_2\!=\!C\!<$ group.

An object of this invention is to provide an improved process for the production of high molecular weight polymers. Another object is to provide an improved process for the polymerization of polymerizable organic compounds, particularly aliphatic conjugated diolefins in an aqueous emulsion. Still another object is to provide such a process which is particularly useful for the production of synthetic rubber of the GR-S type. A further object is to provide such a process by means of which GR-S types of synthetic rubber of superior characteristics may be produced. A still further object is to provide an improved process for the emulsion polymerization of monomers to produce high molecular weight polymers wherein an alkyl mercaptan modifier is employed and the modifier action regulated during the polymerization reaction. Other objects and advantages of my invention will be evident from the following detailed description and the accompanying drawings.

Figs. 1 to 4 of the drawings illustrate graphically comparative physical properties of GR-S polymers produced by emulsion polymerization of butadiene and styrene under comparable conditions.

I have discovered that the rate of reaction of a modifier, such as for instance a tertiary $C_{16}$ mercaptan, with polymer chains at the locus of reaction in a polymerization system employing soap as the emulsifying agent ordinarily exceeds the rate of diffusion of such mercaptans to the point of reaction. I have found, too, that the rate of diffusion may be speeded up by increasing the rate of stirring in the range of about 100 to 500 R. P. M. when using blade type propeller agitation. Equivalent mixing or agitation by any other means will, of course, produce similar improvement. By increasing or decreasing the rate of diffusion of the mercaptan from time to time during the course of the polymerization I have found it possible to maintain the desired rate of mercaptan reaction with the polymer.

In order to understand fully the advantages of the present invention, a summary of conventional polymerization technique as employed in the production of GR-S rubber is herewith presented. An emulsion is prepared by agitating the following recipe:

| | Parts |
|---|---|
| Butadiene | 75 |
| Styrene | 25 |
| Soap | 5 |
| Potassium persulfate | 0.3 |
| Water | 180 |
| Mercaptan, variable | |

Polymerization is effected at a temperature of 50° C. for a period of about 12 hours while maintaining a state of emulsification. The resultant latex is treated with an anti-oxidant, such as phenyl-beta-naphthylamine, which is followed by treatment with a coagulant, such as brine-acid solution. The crude polymer is then washed and dried in preparation for evaluation and subsequent process steps.

The quantity of modifier used in any given recipe is dependent on the type of mercaptan or mercaptans used, and is determined by experiment. However, regardless of the modifier employed certain well established conditions must obtain at the completion of polymerization, among which may be mentioned the following:

(a) Approximately 77 per cent conversion of the monomer charge;

(b) The production of polymers having Mooney viscosity in the range 45-55;

(c) The production of polymers free from benzene-insoluble gels.

This invention includes the use of those modifying agents which when added in a given amount to a polymerization system result in the production of polymer at Y per cent conversion, wherein Y is between 50 and 100, and whose mean average molecular weight decreases as the rate of diffusion of said modifying agent increases.

With respect to extent of monomer conversion it is usually not considered economically feasible to proceed much beyond the 77 per cent value due to the greatly decreased reaction rates prevailing at higher conversion levels. On the other hand it is necessary to realize at adequately high conversion in order to obtain maximum benefit from equipment investment and to reduce costly monomer recovery and recycle operations. Regardless of extenuating economic considerations it is mandatory that a polymer of Mooney viscosity in the range 45-55 be produced. In Fig. 1 the increase in Mooney viscosity with extent of conversion is depicted graphically for several mercaptan modifiers as applied to GR-S copolymerization. It may be noted that the commercial DDM (principally primary $C_{12}$ mercaptan) and tertiary dodecyl mercaptan modifiers result in polymers of rapidly increasing viscosity above about 65 per cent conversion. It is obvious, therefore, that extremely acurate control is necessary in order to stop the reaction before the allowable Mooney viscosity is exceeded. A latitude of only about 4 per cent in conversion is indicated for these widely used modifiers within the allowable limits of Mooney viscosity. Referring again to Fig. 1, it will be seen that when the tertiary hexadecyl mercaptan fraction illustrated was used under favorable operating conditions and at suitable concentration, no such limitation exists, and the reaction may be stopped anywhere between 72 and 86 per cent conversion with production of polymers of acceptable Mooney viscosity. The flat slope of the Mooney viscosity versus conversion curve of polymers modified in this manner is seen to have great utility in the control and production of suitable synthetic rubber polymers.

In the copending patent application (Ser. No. 591,868) of which I am coinventor, the highly advantageous modifier properties of tertiary hexadecyl mercaptan fractions, resulting in the desirable results mentioned in the preceding paragraph, were demonstrated together with means and conditions of operation for achieving these results. I have now found that the action of these desirable mercaptans may be controlled by regulating the rate of diffusion of the modifier in such a manner as to decrease the average mean molecular weight as said rate of diffusion increases and thereby to maintain modifier action at the desired level throughout the conversion period. In this respect the tertiary $C_{16}$ mercaptans furnish an excellent example of those modifiers whose use is contemplated within the terms of this invention; and they may readily be used and easily controlled in their action by the process of the present invention to produce polymers of the most desirable properties.

Thus, I have found, for instance, that in a given reactor and using a constant amount of tertiary hexadecyl mercaptan modifier, the polymer produced when agitating the vessel with a propeller stirrer at 300 R. P. M. had a Mooney viscosity approximately 25 points lower than that produced when the same vessel was agitated by stirring at 150 R. P. M. I have also found that this effect persists throughout the concentration range ordinarily used for modification. Thus, for each degree of agitation of the vessel, a linear relationship between concentration of modifier used and Mooney viscosity of the polymer produced exists; and the lines produced by plotting concentration against Mooney viscosity for various speeds are approximately parallel. For example, in Fig. 2 of the accompanying drawings are depicted such curves observed when a given butadiene-styrene emulsion recipe was polymerized in five gallon reactors at stirring speeds of 150 and 300 R. P. M., respectively, with varying amount of $t$-$C_{16}$ modifier.

The primary mercaptans are not thus affected by the rate of stirring. With the primary mercaptans as the rate of stirring is increased at a given modifier concentration the degree of modification becomes less, i. e., the Mooney viscosity of the product increases. This is particularly true of commercial DDM which is widely used as a modifier. Commercial DDM is an outstanding example of a modifier which is inapplicable in my process. Other primary mercaptans in which mean average molecular weight increases with rate of diffusion, and other modifiers which do not respond at all to changes in rate of diffusion to the reaction locus, are likewise inapplicable.

Inasmuch as the preferred tertiary hexadecyl mercaptan compositions are comprised of a great number of complex isomeric mercaptans, they are characterized on the basis of physical and chemical properties and by their method of preparation. These mercaptans are derived from mixtures of isomeric olefins of structure such that on catalytic addition of hydrogen sulfide, mercaptans of tertiary configuration are obtained. The unusual modifying action of these mercaptans, as more fully discussed hereinafter, is characteristic of tertiary mercaptans having a molecular weight range from about 244 to about 260 and comprising main $C_{16}$ mercaptans, although some tertiary $C_{15}$ and tertiary $C_{17}$ mercaptans may be included due to the extensive overlapping of boiling points of the great number of possible mercaptans of isomeric structure in the tertiary $C_{16}$ mercaptan boiling range. Throughout the present disclosure, my preferred mercaptan compositions are referred to as tertiary hexadecyl mercaptans. While pure tertiary mercaptans in the above molecular weight range may be desirable, purification difficulties are such that the use of fractionated hydrocarbon-mercaptan mixtures is usually expedient. The presence of these substantially inert hydrocarbon diluents is without measurable deleterious effect on the method of controlling the modifying action of the aforesaid tertiary hexadecyl mercaptan compositions. The following tabulation presents physical constants of compositions that may be considered substantially equivalent on the basis of available mercaptan content.

*Tertiary hexadecyl mercaptan concentrates*

|  | (1) | (2) | (3) |
|---|---|---|---|
| Mercaptan Content, per cent | 49.5 | 80 | 99.0 |
| Avg. Molecular Weight | 259 | 249 | 251 |
| RSH Sulfur, Weight per cent | 6.1 | 10.3 | 12.6 |
| Distillation, °F.[1] | (5 mm.) | (5 mm.) | (5 mm.) |
| First Drop | 247 | 252 | 218 |
| 50% Cond | 264 | 267 | 269 |
| 80% Cond | 285 | 287 | 278 |
| 90% Cond | 314 | 305 | 289 |
| 95% Cond | dec. | dec. | dec. |

[1] Rubber Reserve Company Test Method L. M. 2.5.6.

In its more general embodiment, my process comprises controlling the rate of diffusion of the suitable mercaptan modifiers to the reaction locus by control of rate of agitation, or by other suitable means in some instances, and maintaining a balance between said rate of diffusion and mercaptan concentration at any time during the reaction in such a manner as to produce polymers of any desired Mooney viscosity, degree of modification and mean average molecular weight. This may be accomplished without the very close control with regard to degree of polymerization required in conventional polymerization processes.

The efficiency of any mercaptan modifier is dependent upon its concentration at the reaction or polymerization locus in the emulsion, as well as on the inherent chain breaking ability of the particular mercaptan structure used. The concentration of mercaptan which can be developed at the reaction locus depends on the rate of diffusion from the oil phase. When other factors, such as the molecular weight, solubility, soap solution used, and pH are constant, the rate of diffusion is affected by the surface area produced within the emulsion.

In the usual commercial reactors, this means in effect controlling the speed of stirring of a propeller type agitator. The agitation obtained with any given stirring speed will, of course, depend on such factors as design and pitch of the propeller blades, the angle at which the shaft is set in the vessel, distance of the propeller from the bottom of the vessel, etc. While these are not often conveniently made variable, it is possible to provide for variance and thereby produce changes in rate of agitation equivalent to those produced by change in speed.

Agitation may also be carried out by means other than by stirring, for instance, by tumbling, rocking, or the like. Obviously such agitation may be made equivalent to stirring in many cases, and may be controlled and varied by changing speed, etc., in much the same manner, and my invention is equally applicable to control of rate of diffusion by this means.

Diffusion to the reaction locus may be accelerated by means other than by agitation, such as for instance by the presence of a so-called "solubilizing" agent in the emulsion. Thus, the presence of minor quantities of certain organic materials, of which ethylene glycol mono-phenyl ether is an outstanding example, increase the diffusion of the modifier from the oil phase to the reaction locus or to "solubilize" it. Control of the rate of diffusion of the modifier to the reaction locus may be secured by this means also, and I have found that the process of this invention may be carried out using this agency if desired.

In order to produce polymerizates suitable for conversion into high quality synthetic rubber it is generally essential for the polymers to have a high average molecular weight and at the same time to be free from gel. The most desirable polymers of the Buna-S type are those which do not contain large amounts of material of either very high or very low molecular weight. When using the ordinary primary dodecyl mercaptans of the prior art, the rate of depletion of the modifier is such that an overmodified polymer of inadequate chain length is produced in the early stages of polymerization. Then, since excessive quantities of modifier have been consumed, cross-linking sets in during the final phase of polymerization, as evidenced by a very rapid rise in average molecular weight. The average molecular weight of the final product is not sufficiently high to prevent processing operations but the polymers have poor aging properties and otherwise fall short of an ideal synthetic rubber. This lack of control over the rate of reaction of modifier results in both over and under modification and a product containing a portion of polymer of objectionably low molecular weight and another portion having excessively high values. This is illustrated graphically in Fig. 3 where polymer intrinsic viscosities have been plotted against extent of monomer conversion for GR–S product modified with commercial DDM, and tertiary-$C_{12}$ aliphatic mercaptans. (Since it is well known that intrinsic viscosity is a measure of molecular weight, the direct experimental viscosity values are plotted in place of the more cumbersome corresponding molecular weights.) In all these instances an overmodified low molecular weight polymer is produced at conversion below 50 per cent while a rapid transition occurs from relatively low to relatively high molecular weight materials in the range lying between 50 and 77 per cent conversion of monomers. (Above 80 per cent conversion the formation of gel results in a decrease in benzene solubility and the molecular weight curve determined in this way is of no significance.)

The intrinsic viscosity of a polymer is the quotient obtained by dividing (1) the natural logarithm of the relative viscosity of a dilute solution of the polymer by (2) the concentration of the solution in grams of polymer per hundred milliliters of solution. The relative viscosity of the solution is defined as the ratio of the viscosity of the solution to that of the pure solvent from which it is made.

Benzene is normally used as the solvent for the polymers when these determinations are carried out. In most cases, the intrinsic viscosity is roughly proportional to the average molecular weight of the polymer. The product from emulsion polymerization should have an intrinsic viscosity somewhere in the range of 1.8 to 2.4. Generally any material with a lower intrinsic viscosity is soft and sticky; that with a higher intrinsic viscosity is usually tough and hard to process.

The Mooney viscosity is a measure of the shearing force, at a specified temperature and after a definite period of shearing, obtained when a roughened disk is rotated within a sample of the raw polymer held in a surrounding stator. The determination is usually carried out at 212° F. and the measurement is made four minutes after the rotating disk has been set in motion. It is determined in the standard Mooney plastometer as first described in Ind. Eng. Chem., Anal. Ed., 6, 147 (1934).

The Mooney viscosity is sometimes referred to as the Mooney plasticity. Since it is a measure of the ability to mill the sample, the latter term is more descriptive; however, the former is more widely used in the art and is used throughout this specification.

It was demonstrated in the aforementioned patent application, Ser. No. 591,868, that through the action of tertiary hexadecyl mercaptan modifier a degree of molecular weight uniformity may be attained which heretofore has been impossible. In Fig. 3, the contrast of these old modifiers with the behavior of tertiary hexadecyl mercaptan modifier fractions is clearly brought out. The remarkably uniform distribution of molecular weight of polymer produced when using this mercaptan is shown in the figure and is the great contribution to the polymerization art of our previously discovered tertiary hexadecyl mercaptan modifier.

The balance between rate of diffusion to the reaction locus and concentration of modifier present may be maintained also through properly controlling the rates of depletion of the mercaptans used in a blended modifier composition. Thus, low molecular weight tertiary mercaptans, such as tertiary $C_8$ mercaptans, tend to react early in the polymerization, while heavier mercaptans, such as tertiary $C_{16}$ mercaptans, react more slowly. It is possible to prepare blends of tertiary mercaptans which provide the desired degree of modification throughout the reaction, by virtue of the varied rates of depletion of the components and their relative actions, as disclosed in the above mentioned patent application, Ser. No. 575,819.

It is an advantage of my process that it may be operated to produce polymers of nearly constant molecular weight and degree of modification throughout the entire course of a polymerization reaction which is usually highly desirable in present day commercial synthetic rubber manufacture. But it is an added advantage of my process that if desired for manufacture of polymers for a certain specific purpose, the modifier action may be so regulated as to produce polymers of varied molecular weight and Mooney viscosity distributed according to a desired predetermined pattern.

The unusual applicability of the preferred tertiary hexadecyl mercaptan fractions to the process of the present invention is due at least in part to the high concentration of mercaptan available for modification purposes at all stages of conversion. In Fig. 4, a plot of unreacted mercaptan versus the percentage of total monomers converted is presented. In the cases involving modification with commercial DDM mercaptan and tertiary dodecyl mercaptan a rapid rate of depletion occurs at low conversion levels. However, with the tertiary hexadecyl mercaptan preferred in the present invention a straight line curve is obtained indicating that the rate of mercaptan depletion is substantially independent of polymer conversion. As a consequence of this desired behavior of this modifier composition, at the 77 per cent conversion level approximately 29 per cent of the original modifier charge is still available for reaction, thereby obviating any possibility of producing an undermodified polymer. At the same point of conversion only 3 per cent of tertiary $C_{12}$ mercaptan and about 4 per cent commercial DDM mercaptan remain available for modification purposes.

I have found, however, that the linear depletion rate of the tertiary hexadecyl mercaptan lends itself well to the control. The slope of the curve may be increased by increase in agitation but it remains essentially linear. By decrease in agitation below the value at which the curve in Fig. 4 was obtained, (stirring at 300 R. P. M.) depletion at a slower rate may be obtained. Furthermore, sufficient modifier is still present toward the end of the polymerization period to effect normal modification of the polymer and to allow the desired control of the modifier action to be exercised.

It is obvious from the above discussion that the present process is most advantageously employed in conjunction with tertiary $C_{16}$ mercaptans as modifiers, either alone or in admixture with other tertiary mercaptans, and that the primary mercaptans of the prior art do not lend themselves well to such a process of control. With primary mercaptans, the extremely rapid rate of depletion which exists in the initial part of the polymerization already results in overmodification at this stage, and a change in rate of agitation which would increase the availability of the modifier would result only in decreased polymer quality. Conversely, an attempt to control the modification by reduction in depletion rate is impracticable and almost impossible to control due to the very steep slope of the depletion curves. Furthermore, in the later stages of conversion, mercaptan content has been so depleted that any change caused by changed agitation rate can at most have but a very small effect on final results.

In the practice of my invention, in its more specific embodiment to produce the commonly desired polymers of very uniform molecular weight distribution and of Mooney viscosity of 45–55 units, the rate of agitation is controlled throughout the length of the polymerization in conjunction with the mercaptan content existing in a manner to produce the desired uniformity of modification. In most polymerizations, the quantity of mercaptan modifier is most conveniently fixed at a satisfactory concentration for the recipe in use, and the entire quantity of said modifier is charged to the reactor before the start of the polymerization. Thus, in such a case, where the tertiary hexadecyl mercaptan modifier concentration is at its highest initially, by the present process the rate of agitation employed is less than that in conventional practice and is kept at the practicable minimum as the reaction begins. The slope of the modifier depletion curve is reduced, modifier is consumed at lower rate, and consequently polymers of less highly modified characteristics, i. e., greater molecular weight and higher Mooney viscosity are produced, than would be the case at this stage in the polymerization using the usual constant rate of stirring. Referring again to the accompanying drawing, Fig. 3, under the operating conditions heretofore employed, even when using the tertiary hexadecyl modifier, polymers of relatively lower molecular weight are shown at 30 to 50 per cent conversion, and still lower weight polymers than these are made below 30 per cent conversion. (It should be noted that the values plotted represent averages of polymer formed up to that conversion level, and the instantaneous or incremental curve for any given modifier will display a steeper slope than this cumulative type of plot.)

As the reaction proceeds, the progress of the reaction may be followed by means of small samples removed from the polymerizer at intervals, on which determinations of the intrinsic viscosity are made. Modifier content may also be determined if desired. As the modifier concentration declines, in accordance with the linear depletion curve, at the reduced slope caused by the reduced agitation rate, modification will be declining also, and to counteract this the rate of agitation is increased in accordance with my invention by a suitable increment to increase the consumption rate. By suitable balancing of this rate of agitation with the mercaptan content, it is possible to maintain a substantially constant degree of modification throughout most of the polymerization period, particularly above 50 per cent conversion. The incremental, and hence the cumulative curves of molecular weight versus conversion are reduced to essentially zero slope. Throughout a wide range of conversions at which the reaction might be stopped the average molecular weight, and therefore the properties of the total polymer, are extremely constant (due to the regulation of the modifier action throughout). Economics or operating practicability may therefore be allowed to dictate the most suitable degree of conversion with the assurance that not only a satisfactory polymer but one of actually greatly superior properties will be produced in any case.

It is a further advantage of my process that enough modifier remains after the reaction has progressed to a relatively high degree of conversion, to continue to effect suitable modification of the polymer. While this is characteristic of the tertiary hexadecyl mercaptan itself, when the rate of agitation is kept low initially in my process, the reduced rate of depletion leaves even more mercaptan available during the later stages of reaction. This makes possible the increased rate of agitation and mercaptan depletion desirable at this stage in the polymerization to secure suitably modified rubber, which could not be done if sufficient mercaptan did not remain at this point.

It will be obvious that when the polymerization characteristics of a given recipe are well known and the behavior of the reactor in use is familiar, it may become unnecessary to follow the course of reaction by means of frequent determinations of intrinsic viscosity or mercaptan depletion. Other indications such as pressure, heat liberated, viscosity, volume change, etc. will be reasonably reliable guides, which are instantaneously indicated and will serve as aids in controlling the variable agitation rate of my process.

The effect of the controlled agitation of my porcess on the Mooney viscosity is similar to that produced on the molecular weight above discussed. Referring to the attached drawing, Fig. 1, again, a reduction in slope of the Mooney viscosity versus conversion curve, similar to that in the molecular weight curve, occurs with my process increasing the Mooney viscosity at low conversion but affecting it only slightly at conversions of 60 to 90 per cent. Referring also to the attached drawing Fig. 2, in which the average Mooney viscosity of the polymer produced at two different stirring speeds is shown for a given reactor, the manner of operation of the process may be understood. In the initial phases of the reaction in this vessel, in which the rubber produced is ordinarily overmodified, e. g., has a low Mooney viscosity, operations are conducted under conditions, e. g., 150 R. P. M. stirring speed, effective to produce the polymer with the highest Mooney viscosity practicable. As polymerization progresses and the reaction tends to produce undermodified polymer, i. e., high Mooney viscosity, operation conditions are changed gradually toward those giving the lowest practicable Mooney viscosity, e. g., toward 300 R. P. M. The average value actually produced at any given mercaptan content therefore lies somewhere between the two curves of the figure in this particular case, but possess a remarkable uniformity throughout all portions of it not displayed by the polymer produced at any of the conditions used in obtaining either curve at constant agitation.

Polymers of special properties, carefully adjusted to meet specific needs very exactly, are becoming of great importance at the present time. While for most of these types also, polymers of uniform molecular weight and Mooney viscosity are desirable and other factors are varied, some instances arise in which polymers are actually desired in which the properties are non-uniform throughout. In these instances the present process may be operated in such a way as to produce exactly the desired distribution pattern. Thus, by suitable control of the agitation rate at all points in the polymerization polymers may be produced with high proportions of low molecular weight, or of high proportion of high molecular weight, or with relatively large amounts of both the extremes and little of intermediate weight, etc. Any predetermined distribution pattern may be duplicated. The greatest advantage and application of the invention lies at present, however, in the above described operation to produce polymers of very uniform molecular weight.

One means for controlling modification is the continuous addition of modifier to maintain the desired concentration throughout. This has not heretofore been successful, however, and has almost always resulted in overmodified polymers. I have found, however, that this mode of operation can be employed with my process if desired and still further flexibility and regulation are thereby possible. The uniform, linear rates of depletion of the mercaptan are probably responsible for the fact that this advantageous mode of operation is possible in my process.

While polymerization has generally been a batch process up to the present time, continuous processes are now becoming of some importance. My process of regulation of the modifier action is of particularly great importance in this type of operation; whereas, modification by the use of the prior art modifiers and process would generally result in polymers of poor quality.

The following examples will serve to illustrate how the present process is carried out in practice. It will be understood that the actual rates of agitation given pertain to the particular vessels used with agitators designed in a particular manner, carrying certain propeller elements and set into the vessels at the angles specified. The absolute limits of speed of rotation of the agitator within which the operations may be carried out will obviously vary with all these factors and will not be the same in other systems than the one described. As pointed out above, the present process depends upon a controlled rate of diffusion of modifier to the reaction locus, which may be controlled by the speed of stirring. Other methods of agitation entirely different from stirring are applicable, as is shown in the following examples. In most commercial operations in current use, however, agitation is secured by means of stirring, and the vessels used are of such a nature that the numerical limits of the examples are within the general region used in most actual processes.

*Example I*

An emulsion was prepared according to the following formula:

|  | Parts by weight |
|---|---|
| Butadiene (99.2%) | 72 |
| Styrene (99.7%) | 28 |
| Water (zeolite treated) | 180 |
| Soap | 5 |
| Potassium persulfate catalyst | 0.3 |
| Tertiary hexadecyl mercaptan, variable | |

The tertiary hexadecyl mercaptan fraction used had a mercaptan content of 49.5 per cent, and a distillation range at 5 mm. as follows:

|  | °F. |
|---|---|
| First drop | 247 |
| 50% condensed | 264 |
| 80% condensed | 285 |
| 90% condensed | 314 |
| 95%, Decomp. | |

This emulsion was polymerized in five gallon cylindrical reactors approximately 10" internal diameter by 16" deep. Agitation was secured by a propeller bearing two three-inch steel blades driven by a shaft set into the head of the reactor vertically on its center axis, and reaching within 1½" of the bottom.

A series of tests was run using a batch of this emulsion. Batches were made containing varying amounts of the tertiary hexadecyl mercaptan fraction from 1.15 to 1.6 parts by weight. Each of these batches was polymerized at 50° C., stirring speeds of 150 and 300 R. P. M., respectively. The results obtained are tabulated below:

| Tertiary $C_{16}$ Mercaptan | $C_{16}$ Mercaptan Fraction | Stirring Speed | Conversion | Mooney Viscosity of Final Product |
|---|---|---|---|---|
| Parts by Wt. | Parts by Wt. | R. P. M. | Per Cent |  |
| 0.8 | 1.6 | 300 | 77.4 | 16 |
| 0.75 | 1.5 | 300 | 77.7 | 24 |
| 0.7 | 1.4 | 300 | 78.1 | 31 |
| 0.65 | 1.3 | 300 | 77.0 | 54 |
| 0.55 | 1.15 | 300 | 77.4 | 70 |
| 0.8 | 1.6 | 150 | 79.1 | 36 |
| 0.7 | 1.45 | 150 | 77.4 | 53 |
| 0.65 | 1.3 | 150 | 78.9 | 77 |
| 0.55 | 1.15 | 150 | 78.9 | 105 |

Polymerization was carried to substantially the same percentage in each of these runs, as may be seen. Rate of polymerization was unaffected by the stirring speed, since all polymerizations were completed within ±1.1 hours of the mean value of 11.4 hours. The higher degree of modification secured, resulting in lower Mooney viscosity, at increased stirring rates is clearly evident throughout the entire concentration range. The data are also shown graphically on the accompanying drawing, Fig. 2. Mercaptan depletion for the test made at 300 R. P. M. and 0.65 part tertiary $C_{16}$ mercaptan was obtained and the values plotted gave the curve on the accompanying drawing, Fig. 4. The polymer produced at 300 R. P. M. using 0.65 part tertiary $C_{16}$ mercaptan had a sulfur content of 0.10 per cent; sulfur content of the polymer made using 0.8 part tertiary $C_{16}$ mercaptan modifier at 150 R. P. M. was 0.13 per cent.

Example II

Two batches of emulsion were made according to the formula of Example I, containing 0.65 part by weight of tertiary hexadecyl mercaptan, and they were polymerized at 50° C. to approximately 77 per cent conversion in the five gallon reactors described in the example. One lot was stirred at a speed of 300 R. P. M. and the other at 200 R. P. M. Solution viscosities were determined at various points of conversion on each test. The results obtained are as tabulated:

| 300 R. P. M. | | 200 R. P. M. | |
|---|---|---|---|
| Conversion | Solution Viscosity | Conversion | Solution Viscosity |
| Per Cent | | Per Cent | |
| 17.6 | 0.81 | 17.6 | 1.06 |
| 31.0 | 1.09 | 31.3 | 1.12 |
| 56.5 | 1.57 | 60.0 | 1.76 |
| 68.0 | 1.77 | 70.8 | 1.90 |
| 77.0 | 1.81 | 77.0 | 2.29 |

The uniformly higher solution viscosities obtained at the lower stirring speed, denoting higher molecular weight polymer, are clearly shown.

Example III

A batch of emulsion was prepared according to the formula and by the technique of Example I using 0.65 part tertiary hexadecyl mercaptan. It was polymerized at 50° C. in the five gallon reactor. Stirring was commenced at a rate of 150 R. P. M., and this was gradually and steadily increased as polymerization proceeded to a rate of 300 R. P. M. Solution viscosities were determined at various points of conversion. The initial value at 17 per cent conversion was 1.18 and the final value at 77.0 per cent conversion was 2.01, indicating a very uniform distribution of molecular weight throughout the reaction. Mooney viscosity of the final product was 51, and sulfur content was 0.10 per cent.

Example IV

An emulsion was made according to the recipe of Example I using 0.8 part tertiary $C_{16}$ mercaptan. It was polymerized in glass bottles agitated in a constant temperature water bath at 50° C. One set of bottles was subjected to low agitation, i. e., slow rocking with bottles placed at an angle to further reduce agitation. Another set was agitated at a high rate, i. e., end over end at a more rapid speed. After 12.0 hours polymerization, the set with low agitation gave results of 76.1 per cent polymerziation and intrinsic viscosity of 2.04, while those with high agitation had reacted to 77.8 per cent and gave intrinsic viscosities of 1.11 to 1.17.

Example V

Polymerization was carried out at 50° C. in a set of glass bottles according to the technique of Example IV, using the same formula. Agitation was arranged to be low initially but to increase during the test by increased speed and alteration of the position of the bottles. Individual samples were removed at varying degrees of conversion and tested for intrinsic viscosity. At 30 per cent conversion an intrinsic viscosity of 1.40 was obtained and at 77.0 per cent conversion this had increased to only 1.60. Mooney viscosity of the product at 77.0 per cent conversion was 48.

Example VI

An emulsion was prepared according to the recipe of Example I, but using modifier compositions as indicated below. It was polymerized at 50° C. in 5 gallon reactors. Stirring rate was fixed at 300 R. P. M. in all the tests. Blends of tertiary $C_{16}$ mercaptan with other tertiary mercaptans were prepared on the basis of depletion curves such that 50 Mooney viscosity rubber would result at 77 per cent conversion. For this purpose a blend of 75 per cent tertiary $C_{12}$ mercaptan with 25 per cent tertiary $C_{16}$ was used, and a second blend containing 60 per cent tertiary $C_8$ and 40 per cent tertiary $C_{16}$ mercaptan was also used. Charges were prepared containing the two modifier compositions specified in concentrations of 0.36 and 0.39 parts of pure mercaptan, respectively. The reactions were run at 300 R. P. M. to 77.0 per cent conversion. Mooney viscosities of the rubbers produced were 50 and 53, respectively, and intrinsic viscosities of 2.16 and 2.26 were obtained. Sulfur content of the polymers was 0.07 and 0.09 per cent, respectively.

I have thus found that polymers of substantially the same intrinsic viscosity, Mooney viscosity and average mean molecular weight may be obtained under a number of varied conditions. Thus, the following table illustrates conditions which may be used in typical 5-gallon reactors to produce polymer having satisfactory Mooney and intrinsic viscosities at approximately 77 per cent conversion. The variable sulfur contents which can be obtained in polymers of similar properties is clearly brought out.

| Mercaptan | Grams Pure RSH per 100 Grams Monomers | Rate of Stirring | Sulfur Content of Polymer | Mooney Viscosity |
|---|---|---|---|---|
| | | R. P. M. | Wt. Percent | |
| t-16 | 1.00 | 300 | 0.16 | |
| t-16 | 0.75 | 150 | 0.13 | 49 |
| t-16 | 0.65 | 300 | 0.10 | 54 |
| t-16 | 0.65 | (1) | 0.10 | 51 |
| Blend of 75% t-$C_{12}$ and 25% t-$C_{16}$ | 0.36 | 300 | 0.07 | 50 |
| Blend of 60% t-$C_8$ and 40% t-$C_{16}$ | 0.39 | 300 | 0.09 | 53 |

[1] Started at 150 and gradually increased to 300.

The effect of stirring rate on the concentration of tertiary $C_{16}$ mercaptan required to balance it is brought out, as well as control by variation in the depletion rate secured by various modifier blends. The greater quantity of t-$C_{16}$ modifier required to secure the balance with the more rapidly depleted $C_8$ mercaptan as compared to $C_{12}$ is shown.

I claim:

1. An improved process for copolymerizing a mixture comprising about 75 per cent by weight of butadiene-1,3 and about 25 per cent by weight of styrene while dispersed and continuously agitated in an aqueous emulsion in the presence of a soap as emulsifying agent, and in the presence of a polymerization catalyst at a polymerization temperature of about 50° C., which comprises conducting said polymerization in the presence of a tertiary alkyl mercaptan having sixteen carbon atoms per molecule in an amount between 0.55 and 1 part by weight per 100 parts by weight of total butadiene and styrene, initially agitating the polymerization mixture only sufficiently to effect minimum emulsification of the entire system, polymerizing said mixture for a period sufficient to effect conversion of a total of 72 to 86 per cent of said butadiene-styrene mixture, increasing the agitation during said reaction period to a final agitation at least twice as great as the initial agitation, and such that the intrinsic viscosity of the polymers produced is between about 1.8 and 2.4 during the course of said reaction, and recovering a synthetic rubber having a Mooney viscosity in the range of 45 to 55 so produced.

2. An improved process for copolymerizing a mixture comprising about 75 per cent by weight of butadiene-1,3 and about 25 per cent by weight of styrene while dispersed and continuously agitated in an aqueous emulsion in the presence of a soap as emulsifying agent, and in the presence of a polymerization catalyst at a polymerization temperature of about 50° C., which comprises conducting said polymerization in the presence of a tertiary alkyl mercaptan having sixteen carbon atoms per molecule in an amount between 0.36 and 1 part by weight per 100 parts by weight of total butadiene and styrene, initially agitating the polymerization mixture only sufficiently to effect minimum emulsification of the entire system, polymerizing said mixture for a period sufficient to effect conversion of a total of 60 to 90 per cent of said butadiene-styrene mixture, increasing the agitation during said reaction period to a final agitation twice as great as the initial agitation, and recovering a synthetic rubber having a Mooney viscosity in the range of 45 to 55 so produced.

3. An improved process for polymerizing butadiene-1,3 while dispersed and continuously agitated in an aqueous emulsion in the presence of a soap as emulsifying agent, and in the presence of a polymerization catalyst at a polymerization temperature, which comprises conducting said polymerization in the presence of a tertiary alkyl mercaptan having sixteen carbon atoms per molecule in an amount between 0.36 and 1 part by weight per 100 parts by weight of butadiene, initially agitating the polymerization mixture only sufficiently to effect minimum emulsification of the entire system, polymerizing said butadiene for a period sufficient to effect conversion of a total of 60 to 90 per cent of said butadiene, increasing the agitation during said reaction period to a final agitation at least twice as great as the initial agitation, and recovering a synthetic rubber having a Mooney viscosity in the range of 45 to 55 so produced.

4. In a process for copolymerizing a mixture comprising a 1,3-diolefin and an unsaturated organic monomer containing a terminal $CH_2=C<$ group and copolymerizable therewith in aqueous emulsion to produce a synthetic rubber, while dispersed and continuously agitated in an aqueous emulsion in the presence of a soap as emulsifying agent and in the presence of a polymerization catalyst at a polymerization temperature, the improvement which comprises conducting said polymerization in the presence of a tertiary alkyl mercaptan having 16 carbon atoms per molecule in an amount between 0.36 and 1 part by weight per 100 parts by weight of said mixture, initially agitating the polymerization mixture only sufficiently to effect minimum emulsification of the entire system, polymerizing said mixture for a period sufficient to effect conversion of a total of 60 to 90 per cent of said mixture, increasing the agitation during said reaction period to a final agitation at least twice as great as the initial agitation, and recovering a polymeric material so produced.

WALTER A. SCHULZE.

REFERENCES CITED

The following references are of record in the file of this patent:

UNITED STATES PATENTS

| Number | Name | Date |
|---|---|---|
| 2,281,613 | Wollthan et al. | May 5, 1942 |
| 2,378,030 | Olin | June 12, 1945 |
| 2,398,105 | Mack | Apr. 9, 1946 |